United States Patent [19]

Milne et al.

[11] 3,801,918

[45] Apr. 2, 1974

[54] LOW-PHASE-SHIFT INCREMENTAL FM DEMODULATOR

[75] Inventors: David T. Milne, Silver Spring, Md.; George W. Cook, McLean, Va.

[73] Assignee: The United States of America as represented by the Secretary of the Navy, Washington, D.C.

[22] Filed: Sept. 15, 1972

[21] Appl. No.: 289,526

[52] U.S. Cl. .................... 329/104, 178/88, 307/233, 325/320, 328/151, 329/109

[51] Int. Cl. .............................................. H03d 3/00

[58] Field of Search ....... 329/104, 107, 1, 147, 109, 329/106; 328/151; 307/233; 325/320; 178/66 R, 88

[56] References Cited

UNITED STATES PATENTS

| | | | |
|---|---|---|---|
| 3,717,818 | 2/1973 | Herbst | 328/151 X |
| 3,571,712 | 3/1971 | Hellwarth et al. | 325/320 |
| 3,202,834 | 8/1965 | Pingry, III et al. | 307/233 |
| 3,535,658 | 10/1970 | Webb | 328/151 X |
| 3,581,220 | 5/1971 | Bell et al. | 178/66 R X |
| 3,493,877 | 2/1970 | Jacobson | 329/104 X |

*Primary Examiner*—Alfred L. Brody
*Attorney, Agent, or Firm*—R. S. Sciascia; Q. E. Hodges

[57] ABSTRACT

This device demodulates an FM signal by generating switching pulses for each zero crossing of the FM signal. The switching signals are then used to control a charging circuit whose output amplitude is linearly proportional to the modulated frequency and thereby to the original intelligence in amplitude form, used to frequency modulate the carrier. The output is a series of discrete amplitudes forming the envelope of the original information. The device produces a linear correspondence between frequency and amplitude without an intermediate step of removing the carrier in the conventional way by a six pole filter.

25 Claims, 4 Drawing Figures

LOW-PHASE-SHIFT INCREMENTAL FM DEMODULATOR

BACKGROUND OF THE INVENTION

A conventional manner of modulating and demodulating is to vary the time or the width of a pulse and to use this time change to produce an amplitude varying output responsive to the original modulating information. This is conventionally done in pulse width or pulse time or pulse number modulation.

In FM systems, the FM carrier is separated from the modulation information by employing electronic filters. All such filters contain phase shift and delay characteristics resulting in serious distortion of the modulating input waveform. In some cases, as in instrumentation and specifically acoustical measurements, phase shift is considered tolerable, but the waveform of a multi-frequency data signal is significantly distorted by a filter. Data signals of widely separated frequencies produce an output where the higher frequency components are electrically shifted in time by a greater amount than the lower frequency components. This effect is most often seen in certain hydrodynamic propeller tests, for example, and the effect appears in a single channel or when correlating In addition, phase shift from In addtion, phase shift from the filter is also a problem, where many channels have been recorded by different techniques, for example, some channels are recorded using an FM technique and others using an AM technique.

The filter in FM demodulation is made conventionally necessary since the frequency is the reciprocal of the period ($f=1/T$). The frequency and the period in FM demodulation are not linearly related to each other. It is not possible in the case of FM to go directly from the frequency information to the amplitude information as it is in the case of pulse width or pulse time information. The reason is that in pulse time or pulse width information, the time dependent information within the modulated waveform is directly related to the amplitude modulating information and the demodulating step, going from the time dependent information to the amplitude information is a one step process; as in modulation step, wherein the amplitude information is directly proportional to the time dependent information. But, in FM, the information is frequency dependent and where frequency and time are not directly proportional or linearly proportional to each other, the demodulation must be accomplished by means of a filter to separate the carrier or by a means which has none of the disadvantages of a filter.

SUMMARY OF THE INVENTION

An incoming FM wave is received and amplified in the conventional manner. It is then connected to an incremental command converter which provides a narrow command pulse for each and every zero crossing of the FM signal or for each positive and negative excursion, as where the FM signal is biased above ground. Each of the command pulses are considerably narrower than a corresponding FM pulse. The command pulse is used to generate a second pulse called the reset pulse, whose appearance is triggered by the lagging edge of the command command pulse. This reset pulse is also narrow and of short duration.

A timing circuit consisting of a resistance and a capacitance is used to generate the amplitude which is directly and linearly proportional to the frequency. The amplitude of the charging circuit is periodically sampled by a sample and hold circuit which reads the voltage on the charging capacitor and holds this value until the next sample is taken. The time of the sample is coincident with a zero crossing of the FM signal and the response of the RC charging circuit is such that the amplitude of each sample is linearly proportional to the frequency of the corresponding instantaneous FM signal.

The sample is taken by means of a switch, controlled by the command pulse, which connects the sample and hold circuit to the RC charging circuit. The reset pulse occurring at the termination, or the lagging edge of the command pulse, then resets the charging circuit by shorting it to ground, preparing it to charge to a new value, corresponding to the instantaneous frequency of the FM signal.

The response of the demodulator is such that the output amplitude falls off at higher frequencies, thus conforming to the form of the response of a low pass filter. Compensation for this effect is achieved by introducing a filter having a response which is the reciprocal of the demodulator at the output of the demodulator circuit.

The output of the demodulator, at the input of the filter is a step waveform resembling the original amplitude information. This step waveform is produced by the sample and hold circuit wherein the sampled value of the charging circuit is held for the time period between sampling pulses, irrespective of the changes in the modulating signal within that time period. It can be seen by inspecting the step waveform that the absolute peaks of the modulating signal increase as the ratio of the modulating frequency to the carrier frequency increases. This effect is compensated by the filter having an underdamped response, to produce a response characteristic relative to frequency and which is the exact reciprocal of the demodulator response.

OBJECTS OF THE INVENTION

Accordingly, it is an object of this invention to demodulate an FM signal by directly producing an amplitude linearly proportional to the frequency;

It is a second object of this invention to produce an FM demodulator which does not require a phase distorting demodulating filter to bypass the carrier.

DESCRIPTION OF THE PREFERRED EMBODIMENT

This device is built to demodulate information within an FM wave and detected from a tape reproduce head. As such, the information is typically as shown in line A of FIG. 2, having a sine wave form and having a frequency varying from a center frequency $f_c$ to a higher order frequency $(f + \Delta f)$ (corresponding to a higher amplitude signal modulating the center frequency carrier) and a lower frequency $(f - \Delta f)$, lower in frequency than the center frequency $f_c$ (corresponding to a diminished amplitude), In a typical FM system, the center frequency of the carrier $f_c$ might correspond to zero amplitude, $+\Delta f$ might correspond to an amplitude of $+\Delta A$ and $-\Delta f$ might correspond to an amplitude of $-\Delta A$, with $+\Delta A = -(-\Delta A)$. In such a system, the frequency excursions of the modulated wave about the center frequency $f_c$ will be equal above and below the center frequency. Putting it in terms of numbers, if the center frequency of the carrier were 13.5 Khz and the amplitudes were ±2volts respectively, the modulated frequency would experience equal swings in the + and − direction about the center frequency corresponding to the equal swings in amplitude. For example, such a modulated frequency corresponding to equal swings of ±2 volts about zero amplitude might be 13.5 Khz + 1.5 Khz and − 1.5 Khz.

As the information received from the tape head unit is in sine wave information, it is amplified and then compared to a reference to convert the sine wave information to a square wave for the purpose of facilitating the FM detection. This might be done in any number of well known ways and in this device it is accomplished by comparing the amplitude of the sine wave shown in line A of FIG. 2 to a reference and generating a square wave of a corresponding polarity whenever the sine wave changes polarity with regard to the reference. The output of the amplifier and comparator is the square wave shown in line B of FIG. 2, having the exact same frequency as the corresponding sine wave, line A of FIG. 2. In this case, the comparator is adjusted to produce a square wave of ±5 volts amplitude.

Figure 1:
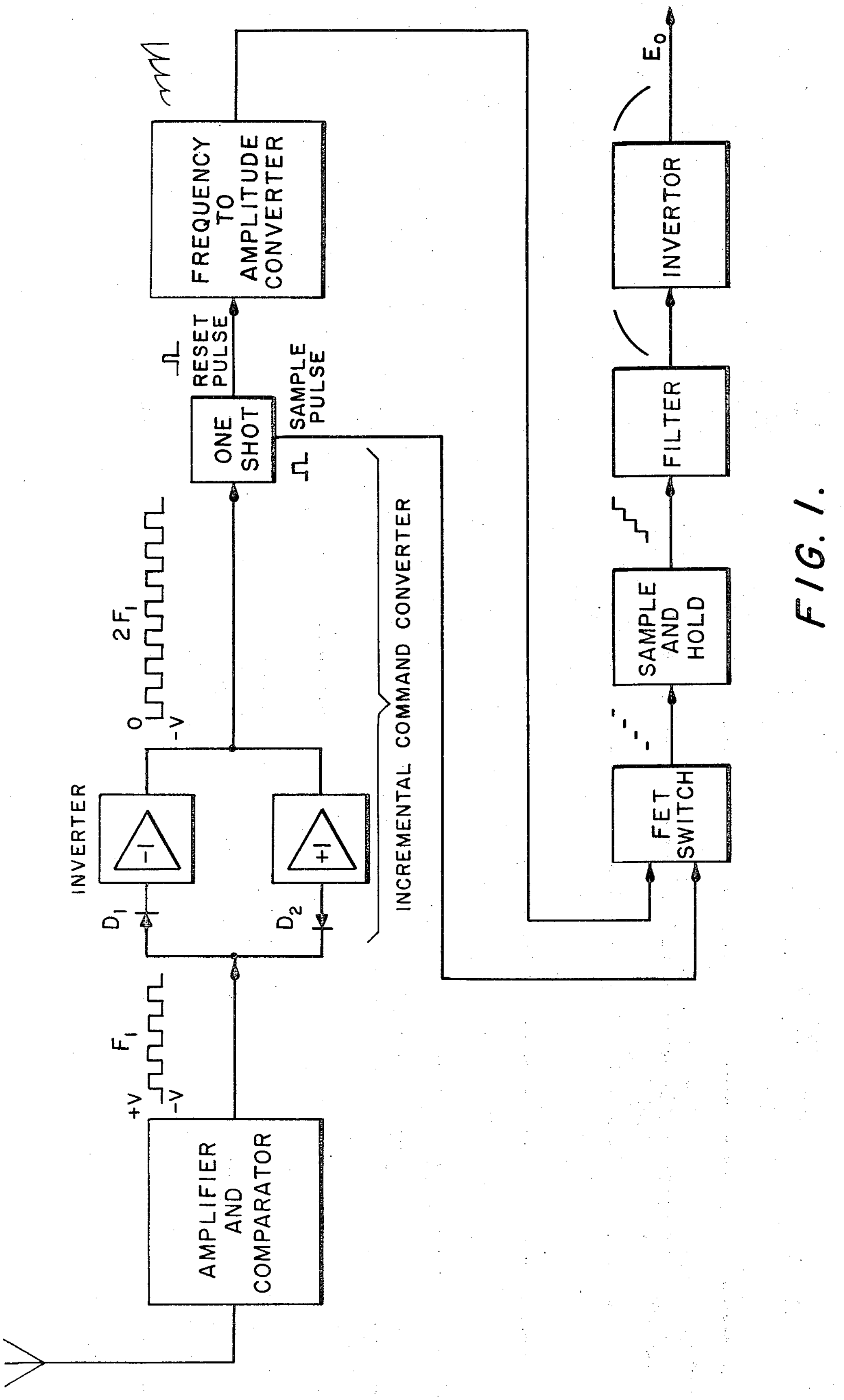
FIG. 1 shows the system of the invention in block form with typical signal waveforms associated with each element of the block diagram.

As shown in line B, as the frequency of the FM signal increases, the period of the square wave of line B diminishes from the period corresponding to the period of the center frequency for a correspondingly lower frequency. As this device utilizes the time dimension between successive zero crossings of the FM wave, it is necessary to produce a command signal each time a zero crossing of the FM signal is realized. This is accomplished by the diodes D1 and D2 arranged as shown. Given a signal from the amplifier and comparator, as shown in FIG. 1, of frequency F1 and having an amplitude of ±V, a signal 2F1 (twice the frequency of the signal of the output of the comparator) is produced at the input to the one shot. A negative pulse is produced for each positive or negative pulse at the output of the comparator. This is simply done by arranging diodes D1 and D2 as shown and inverting the output of diode D1. During positive phases of the comparator output, diode D1 is forward biased and the positive signal is passed to the inverter which then produces a negative pulse corresponding to the positive pulse at its input. When the signal at the comparator output is negative, D2 is forward biased, connecting its amplifier to the comparator output and produces a negative pulse at the input of the oneshot. The onset of each pulse at the input of the oneshot then corresponds to each zero crossing of the FM wave and the pulses at the input to the oneshot are at a rate equal to twice the frequency of the corresponding FM wave.

The oneshot produces two short duration pulses; a sample pulse and a reset pulse. The sample pulse is a narrow pulse, typically no greater in time duration than 10 percent of the period of the highest carrier frequency. The reset pulse is usually set at half the width of the sample pulse and would be typically be therefore five percent of the width of the highest carrier frequency waveform.

Figure 2:
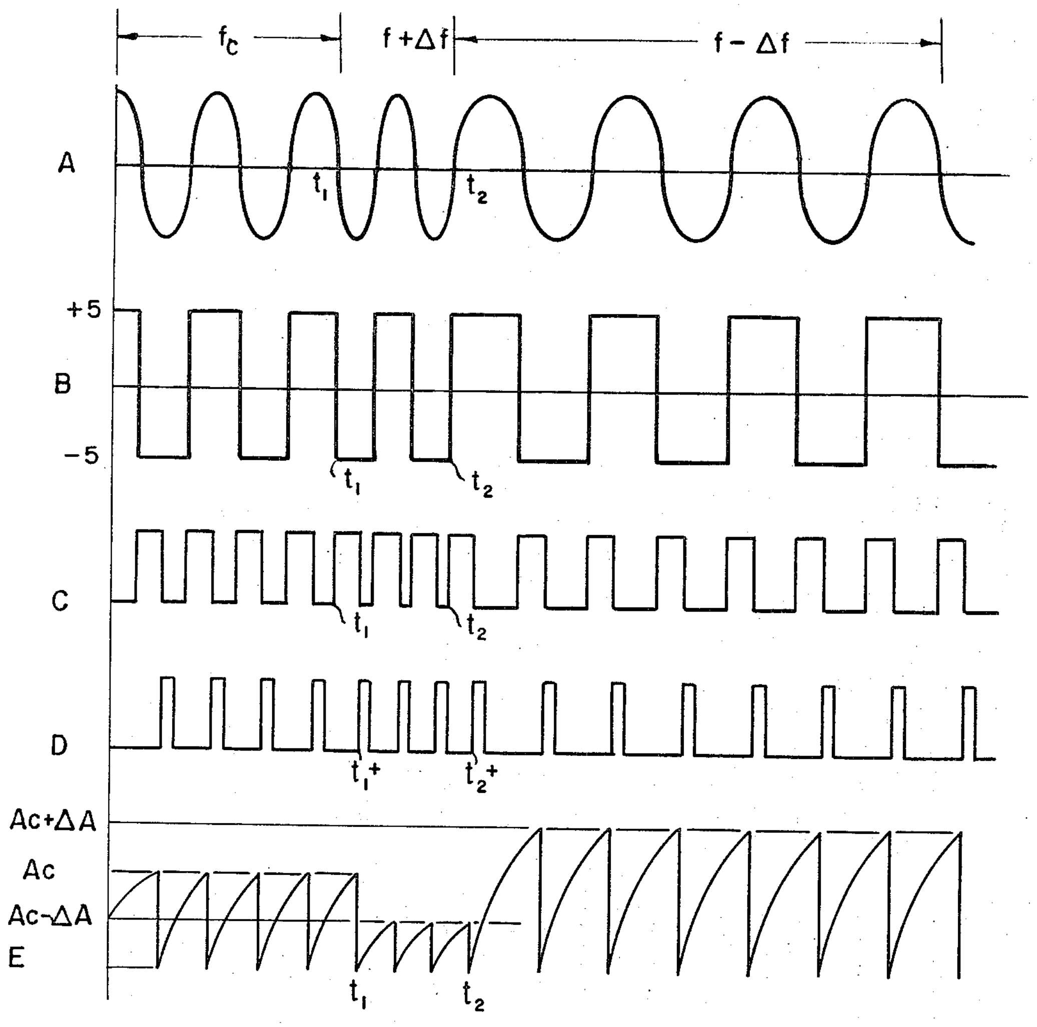
FIG. 2 is a time diagram showing the waveform and the output of various elements of the block diagram shown in FIG. 1, referenced to a common time scale.

The sample pulses are shown on line C of FIG. 2 while the reset pulses produced by the oneshot are shown on line D of FIG. 2.

The short duration sample pulses are produced coincident with the occurrence of each pulse at the input of the oneshot. As these sample pulses are of much shorter duration than the input pulses, they are shown to terminate before the next input pulse is produced. This is clearly shown in lines C and B of FIG. 2.

The reset pulse is generated at the lagging edge or the declining edge of the sample pulse and as it is of shorter duration than the sample pulse, it terminates prior to the beginning the next successive sample pulse.

The frequency-to-amplitude converter is basically an RC free running charging circuit. Its amplitude is controlled by the time constant of the charging circuit and the time during which it charges. Charging time, in turn, is controlled by the reset pulse. A reset pulse received at the frequency of the amplitude converter resets the amplitude of the RC charging circuit to zero by shorting the charging circuit capacitor to ground. When the reset pulse is removed, the RC circuit is allowed to charge again to its new value.

The sample pulse is connected to a FET switch which is also connected to the output of the frequency-to-amplitude converter. The amplitude of the frequency-to-amplitude converter (being the amplitude of the RC charging circuit) is sampled at the instant a sample pulse is received at the FET switch. At the declining edge of the sample pulse, a reset pulse is generated, resetting the frequency-to-amplitude converter back to zero and preparing it to charge to a new amplitude. The output of the FET switch is a succession of amplitudes generated coincidentally with the sample pulse. The sample and hold circuit connected to the output of the FET switch, holds the peak amplitudes of the frequency-to-amplitude converter shown at the output of the FET switch. Each value is held until the next sample pulse causes a new value to be received.

A two pole active filter is used to restore the absolute peaks of the modulation signals which may be missing from the output of the sample and hold output because of the step waveform of the output. Additionally, the degree of loss of these absolute peaks increases the ratio of the modulating frequency to the carrier frequency increases. The filter is used to compensate for this effect, by presenting a slightly underdamped response which is the exact reciprocal of the unfiltered sample and hold circuit. The effect of this filter is to introduce a slight ringing effect which restores the peaks of the modulating signal lost in the demodulation process.

OPERATION OF THE INVENTION

The operation of the system is now described with reference to FIGS. 2 and 3. As described above, the output of the frequency-to-amplitude converter is a product of an RC charging circuit. This output is shown in line E corresponding to the waveform of line A which is instantaneously changed from a center frequency $f_c$ to a high frequency $f + \Delta f$ at $t1$ and which is then instantly changed back to a lower frequency $f - \Delta f$ at $t2$ and where $+\Delta f$ is equal to $-(-\Delta f)$. Accordingly, these equal changes above and below the center frequency were produced by equal changes in the original amplitude signal, above and below a center amplitude which is zero for the purpose of this description. The center amplitude of the RC circuit corresponding to the center frequency of the carrier $fc$ is Ac.

At the instant the frequency changes from $fc$ to $f + \Delta f$, the RC charging time is reduced. As the frequency increases, the time period diminishes, and the diminished time period produces correspondingly closer spaced reset pulses, which control the length of charging time. The charging time is thereby diminished and the RC circuit amplitude diminishes. As the frequency changes to a lower frequency $f - \Delta f$, the time period is correspondingly increased as is the time interval between the appearances of the reset pulses thereby enlarging the charging time and producing a higher amplitude. The amplitudes corresponding to these higher and lower frequencies are $A_c - \Delta A$ and $A_c + \Delta A$ where the higher amplitudes, in this case $A_c + \Delta A$, correspond to the lower frequency $(f - \Delta f)$ and the lower amplitude $A_c - \Delta A$ corresponds to the higher frequency $(f + \Delta f)$. As previously stated, the conditions for modulating were that frequency varied directly and linearly proportionally to the original amplitude information. However, the output of the frequency-to-amplitude converter produces an inverse relationship of amplitude relative to frequency: a higher amplitude output corresponding to a lower frequency input and a lower amplitude output corresponding to a higher frequency input. This reverse effect is adjusted by the inverter shown at the output of the sample and hold circuit and whereby the amplitude variations are reversed relative to the center amplitude $A_c$ to bring the amplitude variations into conformance with the frequency variations of the FM signal and correspondingly to the original amplitude variations of the modulating information.

Figure 4:
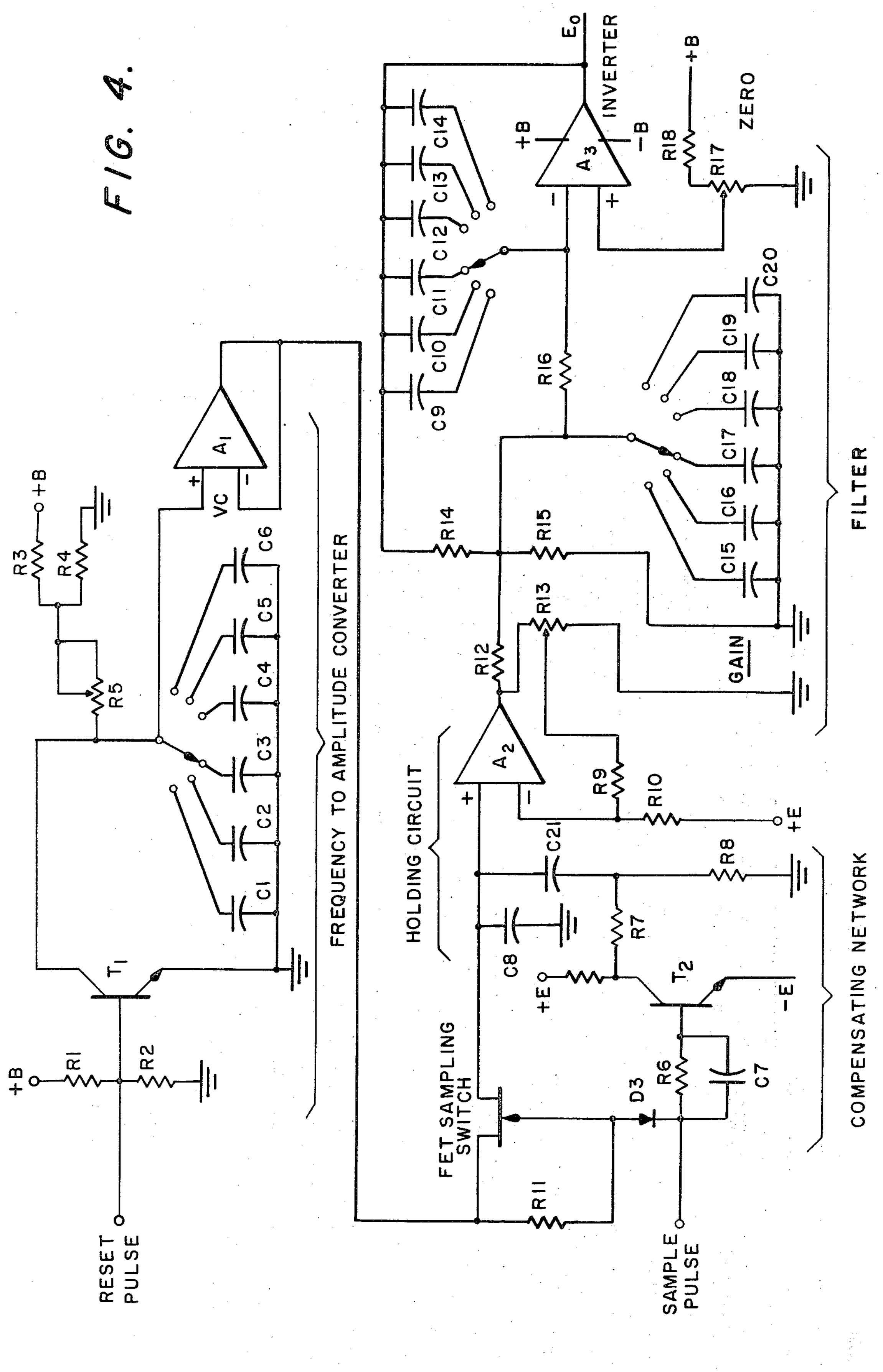
FIG. 4 shows in detail the circuitry for the frequency to amplitude converter, the FET sampling switch, the sample and holding circuit, the filter and the inverter, each of these elements being shown in block form in FIG. 1.

Frequency -to-amplitude converter is the heart of the demodulator and is shown in detail in FIG. 4. In any FM system the carrier frequency deviation $(\Delta f)$ is directly proportional to the input voltage. In detecting this information, amplitudes are produced which are proportional to frequency and thereby correspond to the original modulating amplitude. However, conventional methods require highly complex filters which distort the waveform. This system provides the detection of the original input waveform by producing an output amplitude, responsive to the time periods of the FM waveform and linearly is proportional to the frequency of the waveform.

In an FM wave such as the one shown in FIG. 2 wherein a center frequency carrier $f_c$ is modulated to produce equal changes above and below the center frequency of $f + \Delta f$ and $f - \Delta f$, and where the modulating amplitude information is linearly proportional to the changes in frequency produces therefrom, the amplitude is not linearly proportional to the time period of the instantaneous FM wave. The problem presented then is to derive equal changes in amplitude at the demodulator output, above and below the center amplitude such as $A_c$, for equal changes in frequency of about a center frequency $f_c$.

The period of the wave is the reciprocal of the frequency $(f = 1/T)$. Therefore proportional changes in frequency above and below a center frequency $fc$ will not produce proportional changes in the time period of the corresponding wave. For example, if the center frequency were 10 Khz and it were to be modulated by +50 percent by equal amplitude variations in the positive and negative direction, the modulating frequencies would be 15 Khz and 5 Khz respectively. However, the time period for the 5 Khz modulated waveform is $T=0.2 \times 10^{-3}$ seconds. The time period for the center frequency or carrier is $0.1 \times 10^{-3}$ seconds and it can be seen by inspection that the changes in time period are not proportional to the changes in frequency and the changes in amplitude.

A frequency to amplitude conversion is then required which eliminates the disproportionable effect in period $T$ relative to the frequency. This is accomplished by means of an RC circuit within the frequence-to-amplitude converter. Its transfer function represents a linear relationship between output amplitude and input frequency and produces an amplitude function which is the inverse of the corresponding modulating amplitude information relative to the center amplitude Ac corresponding to the carrier frequency fc.

As shown in the time diagram of FIG. 2, line E, the amplitude information produced at the output of the frequency-to-amplitude converter would be equal and opposite amplitude swings about the center amplitude Ac corresponding to equal and opposite frequency swings of $f + \Delta f$ and $f - \Delta f$ about the center frequency $f_c$; but with the amplitude relationship inverted so that the lower amplitude $Ac - \Delta A$ is produced corresponding to the higher frequency $f + \Delta f fc$, and the higher amplitude $Ac + \Delta A$ produced for the lower frequency component of the FM wave, $f - \Delta f$.

The peak amplitude of the frequency to amplitude converter is measured through the FET switch, the sample pulse and the sample and hold circuit. The FET switch opens at the command of the sample pulse received at the output of the oneshot. The FET switch connects the frequency-to-amplitude converter output to the sample and hold circuit which reads this peak output of the frequency-to-amplitude converter and holds it until the next successive sample pulse is received. The output is seen as a staircase shown at the output of the sample and hold circuit in FIG. 1 wherein the peaks of the modulating signal are lost due to the sampling discontinuity, and these peaks are reinserted in the output by means of the underdamped two pole active filter. An inverter, within the filter is introduced to reverse the amplitude relationship with respect to the center amplitude Ac. As described hereabove, the amplitude at the output of the frequency-to-amplitude converter is inversely related to the frequency change so that higher frequencies produce smaller amplitude outputs and lower frequencies produce a higher amplitude output. The inverter changes this relationship to produce a direct linear correspondence between the output amplitude and the frequency.

Figure 3:
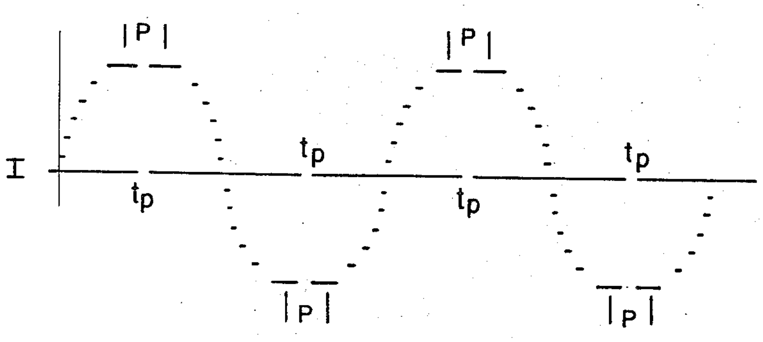
FIG. 3 shows, by a time diagram, a typical output of a sample and hold circuit wherein the signal is shown as missing the peak portions due to the step function of the wave. The time diagram of FIG. 3 is expanded much beyond that in FIG. 2 to show at least one cycle of the reproduced original amplitude information.

The loss of the peaks due to the sampling method of the demodulator is graphically shown in FIG. 3 wherein the peaks, bracketed by a P at each peak, are not reproduced because the peaks appear between successive samples separated by a time *tp*. As the device would be unresponsive to the amplitude changes between sampling periods, these peaks are lost and are reinserted by means of the filter as described above.

Referring now to FIG. 4, the details of the frequency-to-amplitude converter, the sample and hold circuit and the filter and inverter networks are shown.

The frequency-to-amplitude converter consists of a shorting switch comprising the transistor $T_1$, biased from a positive source +B through resistors R1 and R2. The emitter of the transistor T1 is connected directly to ground and the collector is connected to switch $S_1$ and thereby directly to a selected one of the capacitors, C1 – C6. The charging circuit consists of voltage dividing network R3 and R4, and potentiometer R5 in series with a selected capacitor. The potentiometer R5 is used here to finely adjust the shape of the charging function to provide equal + and − amplitude deviations for equal and opposite frequency deviations, and is adjusted in use. If desired, the resistors values can be precalculated using the appropriate values for the capacitors and the time constant $T_1$ to produce the desired result. A selection of capacitances is provided to fit the frequency range of the demodulator. The capacitance values relative to frequency and tape speed are given in Table I below and are IRIG Standards. A buffer amplifier A, reads the voltage across the capacitor and its output is connected to the FET sampling switch. The sampling switch consists of resistance Ru, the FET, diode D3, and the compensating network consisting of R6, C7, transistor T2, R7 and R8 and C8.

The holding circuit is simply shown as capacitance C8 across the output of the FET sampling switch and the input of the amplifying network consisting of the amplifier $A_2$, resistances R9 and R10 and adjustable gain resistance R13.

The two pole active filter comprises the elements R12, R14, R16, one of the capacitances selected from the capacitor bank C9 – C14, one of the capacitances selected from the capacitor bank C15 – C20 and inverting amplifier A3. A zero adjust for the inverting amplifier A3 is provided by source +B in series with fixed resistance R18 and adjustable resistance R17.

In operation, an appropriate capacitor for the tape speed and frequency used and selected from each of the capacitor banks C1 – C6, C9 – C14, and C15 – C20. These capacitances in their values are given in Table I below. A reset pulse applied from the oneshot turns transistor T1 on, producing a short circuit between the capacitor (C3) and ground. The voltage across the capacitance is instantly reduced to zero and upon the removal of the narrow reset pulse, the capacitance begins to charge again through resistance R3 and R5. Voltage across the capacitance with respect to time is an exponential charging function ($V=+B\ (1-e^{-t/RC})$, shown in line E of FIG. 2.

The buffer amplifier A1 connects this voltage to the input of the FET sampling switch. Upon the occurrence of a sample pulse the FET sampling switch is closed connecting the buffer amplifier $A_1$ to capacitance C8 and the holding circuit amplifier input $A_2$. The compensating network feeds back a portion of the sampling pulse, reversed in phase, to cancel the switching spike experienced at the FET sampling switch.

At the lagging edge of the sampling pulse, the reset pulse reoccurred, shorting the capacitance ($C_3$) to ground and causing it to discharge so it may recharge to a new value consistent with the time for the next successive reset pulse to appear. The holding circuit holds the last sample value, until a new sampling pulse is received, and applies it to the input of the filter network.

The filter network includes a scaling resistance R15 to reduce the amplitude of the input signal across the filter which is a two pole active filter, of a type well known in the art. Therefore, the filter does not require additional definition for the purpose of this disclosure. The amplifier A3 is additionally an inverter which reverses the relationship of the amplitude at the input of the inverter with respect to the center amplitude Ac so that a direct relationship between amplitude and frequency is reproduced at its output.

The output of the sample and hold circuit is a staircase waveform with the number of steps per modulation cycle equal to twice the ratio of the carrier frequency to the modulation frequency. If the carrier center frequency is 108 Khz and the modulation frequency is 1 Khz, then the frequency at the input of the oneshot is 216 Khz of 216 samples per modulation cycle. Conversely, if the modulation frequency is 20 Khz then only 10 samples per modulation cycle is experienced. The ability of this device to accurately reproduce the modulating information is best at the higher ratios of carrier frequency to modulation frequency.

The table below provides identification of which capacitors must be selected from each capacitor bank relative to tape speed and carrier frequency. The tape speeds and frequency are the standard International Range Instrumentation Group standards (IRIG) and are given below.

TABLE I

| $F_c$ | IPS | Capacitors |
|---|---|---|
| 3.375 Khz | 1.78 | C6, C14 and C20 |
| 6.7 Khz | 3.75 | C5, C13, C19 |
| 13.5 Khz | 7.50 | C4, C12, C18 |
| 27 Khz | 15 | C3, C11, C17 |
| 54 Khz | 30 | C2, C10, C16 |
| 108 Khz | 60 | C1, C9, C15 |

What is claimed is:

1. An FM signal demodulator system comprising:
first means for determining the period of each half cycle of said FM signal;
second means including an output, responsive to said first means, for producing at its output discrete amplitude signals proportional to the period of each said half cycle and being substantially linearly proportional to the frequency of said FM signal;
whereby the discrete amplitude signals define the modulating waveform of said FM signal.

2. The system of claim 26 wherein:
said second means includes a timer preset to produce at its output a first amplitude signal corresponding to the carrier frequency of said FM signal and at least second and third signals having substantially equal amplitude deviations from said first signal, said second and third signals corresponding to equal frequency deviations from the carrier frequency of said FM signal.

3. The system of claim 2, wherein:

said timer is a Resistance-Capacitance charging circuit having a said time constant $T=-t/RC$ for producing a linear proportionality between the frequency of the FM signal and the corresponding amplitude at the output of the said second means.

4. The system of claim 3, wherein:

the number of discrete amplitudes produced per modulation cycle, by said second means, is twice the ratio of the carrier frequency to the modulation frequency of the FM signal.

5. The system of claim 4, wherein:

said first means for determining the periods of each discrete FM pulse generates a pulse for each positive or negative excursion of the FM signal.

6. The system of claim 5, wherein:

said first means includes a one-shot multivibrator responsive to said pulses generated for each positive or negative excursion;

said one-shot generating reset pulses and sample pulses; and said second means includes a sampling means including an output for sampling the amplitude of said output signals from said timer circuit in response to a sample pulse.

7. The system of claim 6, wherein:

said sampling means includes holding means for holding said sampled amplitude until the next successive sample pulse is received.

8. The system of claim 7, wherein:

said second means includes reset means for resetting said timer circuit;

said means for resetting, discharging said charging circuit and placing said timer circuit in condition for charging to a new amplitude indicative of the corresponding FM frequency.

9. The system of claim 8, wherein:

said reset pulses are produced at the lagging edge of the sample pulses.

10. The system of claim 9, wherein:

said sample means includes a switching means for connecting said charging circuit to said sample and hold circuit in response to said sample pulse;

said reset means including means to connect said charging circuit to ground to discharge said charging circuit.

11. The system of claim 10, including:

a filter connected to the output of said sample and hold means to compensate for loss of the peak values of the modulating signal occurring in time between sample pulses, and as reproduced at the sample and hold means output.

12. The system of claim 11, wherein:

said filter response is the reciprocal of the unfiltered sample and hold output.

13. The system of claim 10, including:

a filter connected to the output of said sample and hold circuit to compensate for the diminution of the peaks of the modulation signal occurring in time between sample pulses and as reproduced at the sample and hold circuit output.

14. The system of claim 13, wherein:

said filter response is the reciprocal of the unfiltered sample and hold means.

15. The system of claim 5, including:

means for inverting the said second and third amplitudes with respect to the said first amplitude.

16. A method for FM demodulation, comprising the steps of:

determining the period of each discrete F.M. pulse;

producing corresponding discrete amplitudes proportional to the said periods and being substantially linearly proportional to the F.M. frequency, for defining the modulating amplitude waveform.

17. The method of claim 16, wherein:

said step of defining the period of each discrete F.M. pulse includes the steps of generating a pulse for each positive or negative excursion of the F.M. wave.

18. The method of claim 17, wherein:

said step of producing corresponding discrete amplitudes includes the step of timing each said generated pulse; and producing an amplitude proportional to the period of each of said generated pulses.

19. The method of claim 18, wherein:

said step of producing proportional amplitudes includes the step of producing amplitudes exponentially related to each said period of said generated pulses.

20. The method of claim 19, wherein:

said step of generating pulses includes the step of producing a number of discrete amplitudes equal to twice the ratio of the carrier frequency to the modulation frequency of the F.M. signal.

21. The method of claim 20, wherein:

said step of producing corresponding discrete amplitudes includes the step of sampling each said exponentially related signal;

holding each said sampled signal until the next sampled signal is received; and reconstructing the original amplitude information from each said sample.

22. The method of claim 21, wherein:

said step of reconstructing includes the step of inverting the amplitudes of the samples.

23. The method of claim 22, wherein:

said step of timing includes the step of setting the timer to produce a first amplitude corresponding to the center frequency of the F.M. signal; and said step of inverting includes the step of inverting the sampled amplitudes with respect to said first amplitude to produce an amplitude output substantially linearly proportional to the F.M. frequency.

24. The method of claim 23, wherein:

said step of reconstructing includes the step of filtering the sampled signal to restore the peak values of the modulating signal occurring in time between samples.

25. The method of claim 24, wherein:

said step of reconstructing includes the step of filtering with a filter having a reciprocal relation to the response of the sampling and holding circuit.

* * * * *